(12) United States Patent
Black (10) Patent No.: US 9,914,000 B2
(45) Date of Patent: Mar. 13, 2018

(54) AERIAL FIRE-FIGHTING BUCKET (71) Applicant: AERIAL FIRE CONTROL PTY LTD, Hahndorf, South Australia (AU)

(72) Inventor: Christopher Black, Hahndorf (AU)

(73) Assignee: AERIAL FIRE CONTROL PTY LTD, Hahndorf, South Australia (AU)

( * ) Notice: Subject to any disclaimer, the term of this patent is extended or adjusted under 35 U.S.C. 154(b) by 13 days.

(21) Appl. No.: 14/963,561

(22) Filed: Dec. 9, 2015

(65) Prior Publication Data

US 2016/0166863 A1    Jun. 16, 2016

(30) Foreign Application Priority Data

Dec. 10, 2014    (AU) .............................. 2014904991

(51) Int. Cl.
*A62C 25/00* (2006.01)
*A62C 3/02* (2006.01)
*F16K 31/04* (2006.01)

(52) U.S. Cl.
CPC ............ *A62C 3/0235* (2013.01); *F16K 31/04* (2013.01)

(58) Field of Classification Search
CPC ....... A62C 3/0235; A62C 5/033; A62C 5/002; F16K 31/04
USPC ......................................................... 169/53
See application file for complete search history.

(56) References Cited

U.S. PATENT DOCUMENTS

| | | | |
|---|---|---|---|
| 2,941,753 A * | 6/1960 | Ripper | .................... B64D 1/16 239/171 |
| 3,661,211 A | 5/1972 | Powers | |
| 3,710,868 A | 1/1973 | Chadwick | |
| 4,240,507 A | 12/1980 | Hokkanen | |
| 5,326,053 A | 7/1994 | Pahl et al. | |
| 5,560,429 A * | 10/1996 | Needham | ................. A62C 8/02 169/34 |
| 6,125,942 A | 10/2000 | Kaufman et al. | |
| 2005/0087651 A1 | 4/2005 | Powers et al. | |
| 2006/0097112 A1 * | 5/2006 | Hall | ..................... A62C 3/0235 244/136 |
| 2008/0314601 A1 | 12/2008 | Cafferata | |

OTHER PUBLICATIONS

Search document issued in Australian application No. 2014904991 dated Aug. 25, 2015.

* cited by examiner

*Primary Examiner* — Davis Hwu
(74) *Attorney, Agent, or Firm* — Nath, Goldberg & Meyer; Jerald L. Meyer (57) ABSTRACT

The present invention relates to an aerial fire-fighting bucket. The bucket includes a base plate and a valve arrangement including at least one valve and a liner actuator. The base plate includes at least one aperture and the valve is arranged to block the aperture in a closed position and to allow fluid to pass from within the bucket through the aperture when in an open position. The valve is arranged to be moved by the linear actuator generally transversely across an upper face of the base plate between the closed position and the open position of the valve to progressively reveal the aperture.

19 Claims, 6 Drawing Sheets

AERIAL FIRE-FIGHTING BUCKET

TECHNICAL FIELD

The present invention relates to an aerial fire-fighting bucket of the type typically suspended below an aircraft. Typically, such an aircraft would be a helicopter.

BACKGROUND OF INVENTION

Large fires or fires in remote locations are often fought using aircraft to drop chemical fire retardants or water either directly on the fire or at nearby locations to create a fire break. Helicopters are often used for such operations because they do not require a dedicated landing strip and more importantly because they can fill their fire-fighting bucket without the need to land the helicopter. Typically, the bucket can be filled at a nearby body of water which may include a lake, dam, river or even a swimming pool. Having the ability to fill the bucket in this way reduces the time between water drops, hopefully resulting in the fire being extinguished more quickly. Filling the bucket locally also saves fuel and other running costs which can be extremely expensive.

U.S. Pat. No. 5,829,809 describes a bucket for use with an aircraft which permits dumping of two or more separate loads of water for a single fill of the bucket. The apparatus has an outer bucket with an outer dump valve and an inner bucket with an inner dump valve. The inner bucket is located within the outer bucket and a space is established therebetween to provide a clearance to receive water. The dump valves are flexible sleeves which are operable independently of each other and in sequence so that the outer dump valve is opened before the inner dump valve. As evident from the Figures of U.S. Pat. No. 5,829,809, the illustrated apparatus includes significant rigging and lines to control the operation of the valves. Such rigging and lines may be easily fouled resulting in the inability to release water from the bucket and in an extreme situation this may result in the decision to jettison the bucket. Buckets according to U.S. Pat. No. 5,829,809 also have a tendency to leak due to the inner dump valve not sealing correctly, the purse strings are very prone to wear and tend to have a poor drop pattern due to the inner dump valve flailing in the wind when the water is jettisoned. This type of bucket is also very prone to sailing, causing the bucket to move from substantially below the helicopter when full to very close to the tail rotor when empty. This is potentially very dangerous.

U.S. Pat. No. 6,192,990 describes a fire-fighting bucket including a valve 18 for controllably releasing a stream of fluid over a fire. As best shown by a comparison of FIGS. 3 and 4, the valve 18 releases water from the bucket when the solid side wall 60 of the valve 18 is raised vertically (FIG. 4) away from the base plate 40. Valve 18 is controlled by a complicated control head suspended above the bucket. Further, the valve 18 is very large and thus takes up a lot of space inside the bucket reducing the bucket's water carrying capacity. The valve seals are very difficult to replace and the bucket is very heavy. Accordingly, the bucket is very difficult to transport, store and load into an aircraft.

The applicant's earlier Australian patent application 2005225146 identified various problems associated with different fire-fighting buckets and also the valves used in such buckets. That application further described a valve used to control the release of water from a fire-fighting bucket. The valve 1 is located within body 10 and is operated by a liner screw motor that can be controlled to close the sealing plates 7 against their respective ports 19. As apparent from FIG. 4, the body 10 is quite large and the ports 19 are located above the base of the bucket. Accordingly, even if the walls of the bucket 20 are capable of collapse, the size and configuration of the valve, which is not collapsible, makes transport and storage of the bucket 20 problematic.

Figure 8:
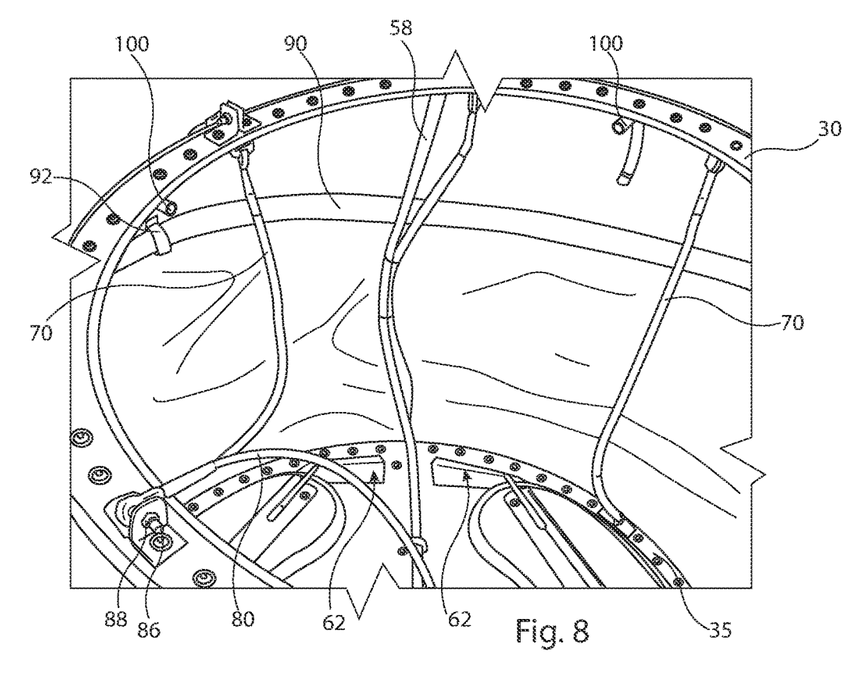
FIG. 8 is another inside view of the bucket showing the valves closed.
Figure 9:
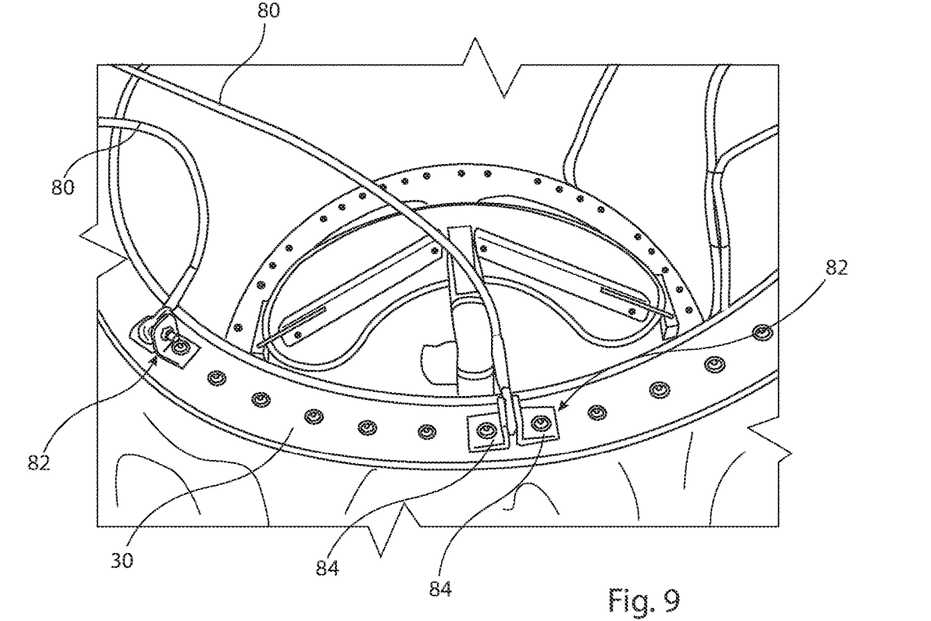
FIG. 9 is another inside view of the bucket showing one of the valves in a partially open position.
Figure 10:
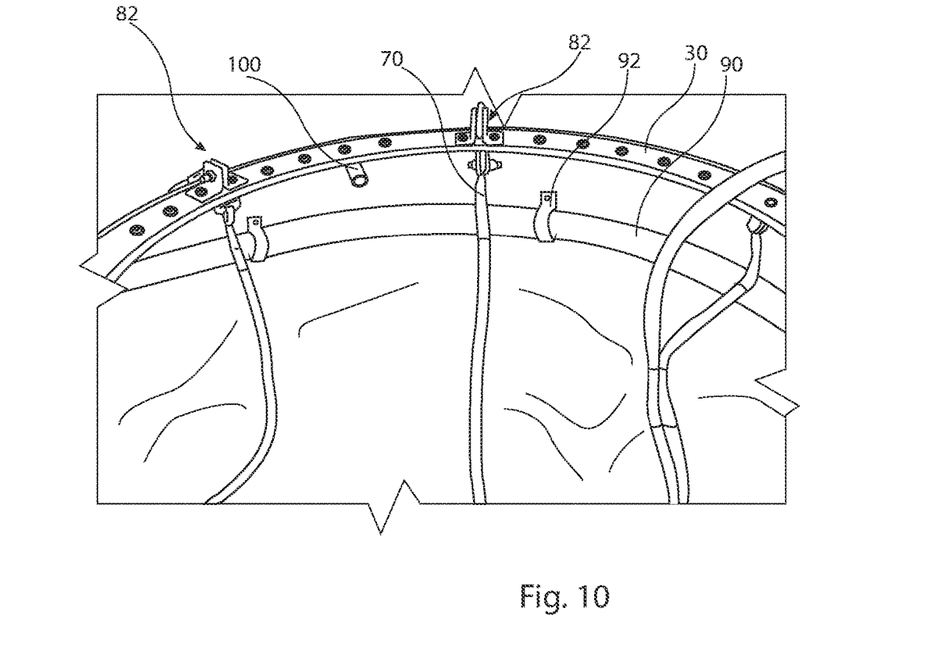
FIG. 10 is an inside view of the bucket showing a part of the bag expansion device and one of the air release devices.

U.S. Pat. No. 6,125,942 describes a fire-fighting system that uses a bucket suspended from a helicopter to deposit a fire retardant onto the fire. More particularly, U.S. Pat. No. 6,125,942 describes a bucket with a valve for varying the characteristics of the flow that is discharged from the bucket's opening. FIGS. 8 and 9 illustrate a fast-acting valve 206 that includes a top plate 208 that rotates on a shaft 210. The top plate 208 has openings 212 that can be aligned, upon rotation of the top plate 208, with openings 220 in a lower plate 222 fixed in the bottom of the bucket. FIG. 10 illustrates an alternative valve 306. The valve 306 adopts a clam shell configuration, in which two cylindrical flaps 308, 310 are hinged at their axis of rotation to a shaft 312. The valve arrangements described in U.S. Pat. No. 6,125,942 suffer from a number of disadvantages including high valve wear due to friction on the valve seal, poor flow control of water through the valve and considerable valve opening and closing lag time.

The present invention seeks to provide an improved fire-fighting bucket and related components thereof.

The discussion of the background to the invention herein is included to explain the context of the invention. This is not to be taken as an admission that any of the material referred to was published, known or part of the common general knowledge as at the priority date of this application.

SUMMARY OF INVENTION

According to one aspect of the present invention there is provided an aerial fire-fighting bucket including a base plate and a valve arrangement including at least one valve and a linear actuator, the base plate including a least one aperture and the valve arranged to block the aperture in a closed position and to allow fluid to pass from within the bucket through the aperture when in an open position, and wherein the valve is arranged to be moved by the linear actuator generally transversely across an upper face of the base plate between the closed position and the open position of the valve to progressively reveal the aperture.

Such an arrangement enables the valve to move across the upper face so that the aperture is progressively exposed to fluid within the bucket and in this manner the user can achieve greater control of water flow through the aperture.

The generally transverse movement of the valve between the open and closed positions, that is movement of the valve in a plane substantially parallel to the plane of the upper face of the base plate, facilitates a reduction in the height of an upper most part of the valve arrangement when measured from the base plate and as compared to prior art arrangements. This is due to the valve moving across a width dimension of the apertures progressively exposing the aperture to fluid within the bucket as opposed to lifting the valve away from the base plate to expose the full aperture in one lifting action.

Preferably, the valve is configured so that as the valve is moved away from the closed position towards the fully open position, the valve clears at least a part of the aperture so that fluid flows through the aperture without passing through the valve. When the valve is in the fully open position, the valve clears the aperture and does not obstruct flow through any part of the aperture.

Preferably, the valve includes a substantially flat plate sized and shaped to fully cover and block flow through the at least one aperture when the valve is the closed position.

Preferably, a seal extends around the periphery of the flat plate establishing a seal between the flat plate and the upper face of the base plate.

Preferably, at least one guide is mounted on the base plate and is configured to guide movement of the valve, particularly movement towards the fully closed position. In accordance with a preferred embodiment, two guides are provided for each valve and the valve is arranged to move along a gap established between the two guides, with movement of the valve guided by contact with the guides.

Preferably, each valve may be arranged so that as the valve is moved between the closed and open position, the valve is caused to lift vertically away from the base plate. An amount of lift is provided to help break the seal between the seal and the upper face of the base plate. The amount of lift is small compared to the length of transverse travel between the fully open and closed positions of the valve. For example, if the valve travels a distance of about 100 mm across the upper face of the base plate between the closed and fully open positions, the valve will lift about 50 mm vertically away from the base plate. Depending on the particular operational requirements of the valve, valve lift is preferably in the order of about 50 mm to about 100 mm. In accordance with an embodiment of the invention, valve lift is achieved by a lift bar attached to the valve. As the valve moves between the closed and fully open positions, the lift bar travels along a cam face shaped to cause lift of the valve away from the base plate when the valve moves away from the closed position. The cam face may be formed on the guide. To this end, a guide may adopt a triangular block shape with an angled uppermost face of the guide being arranged to act as the cam face.

The valve arrangement preferably further includes at least one actuator arranged to engage with each valve. The actuator being arranged so that it can be driven inwardly and outwardly to thereby move the valve between the closed and fully open positions. The actuator is preferably arranged to enable the valve to be moved to intermediate positions between the closed and fully open position to thereby allow differing amounts of fluid to be released from the bucket. The actuators are preferably driven by an electrical arrangement (e.g. an electric motor), with electrical power provided through waterproof lines extending from the aircraft. The actuators are preferably mounted so as to be adjustable in both a vertical and a horizontal direction, thereby allowing some adjustment of the movement of the valve as it is driven between the closed, open and fully opened positions, ensuring 100% sealing of the valve against the base plate. The actuator is preferably arranged for direct connection to the valve so as to remove any lag in valve function.

Preferably, the valve arrangement is mounted on the base plate.

Preferably, the valve arrangement includes two valves and the electrical arrangement is located centrally of the base plate and between the two valves. Alternatively, where there are more than two valves, the valves are preferably spaced evenly over the base plate.

In accordance with an embodiment of the first aspect of the invention, the bucket includes a well wall connected to the base plate and arranged to be collapsible so as to be moveable between an in-use position where the well wall together with the base plate establish a well for holding fluid, and a storage position in which the well wall is collapsed and capable of being located substantially adjacent to the base plate. To this end, the well wall is preferably made of a sheet material, for example a plastic sheet material, that can be readily folded, for example a polyurethane sheet material or a PVC sheet material, with a thickness of about 3 to about 6 mm. The sheet material must have sufficient strength to prevent tearing or stretching when the bucket is filled with liquid.

As described herein, the aerial fire-fighting bucket includes a base plate, a collapsible well wall and at least one former, said at least one former arranged to provide support to at least a part of the well wall.

The at least one former is expandable and is arranged when expanded to support the part of the well wall so as to prevent that part from collapsing towards the base plate. Preferably, the expanded former supports the well wall so that a well is established between the base plate and the supported well wall for receiving fluid.

The former preferably extends substantially about an inner periphery of the well wall and is arranged to be expanded by a fluid, such as compressed air. However, the former may be located on the outer periphery of the well wall.

In accordance with an embodiment of the invention, two formers are provided. The first former is arranged to expand the widest diameter of the well wall. The second former is set above the first former so as to be located about three-quarters the way up the well wall. The inclusion of first and second formers assists with filling of the bucket by not allowing the well wall to collapse over the base plate during filling due to differential water pressure. Further, the inclusion of the second former ensures that the material of the well wall does not collapse to a position when the bucket begins to empty that would allow water to be retained around the bottom outer edge of the well wall.

The formers are preferably arranged for rapid expansion of the well wall. To this end, each former is preferably held in position on the well wall using, for example, at least one bracket. Only a relatively small amount of fluid (e.g. air) is required to expand each former to its full diameter and to a preferred pre-determined pressure setting. A compressor, preferably without a pressure tank, is used to expand the formers and will preferably be powered by an external 24V DC power socket on the aircraft. Such an arrangement reduces the amount of time required for the pilot or support crew to prepare the bucket for fire-fighting duties.

A bucket with at least one former according to an embodiment of the invention helps to provide stable flight characteristics to the bucket when flown empty, partly loaded or full. This is due to the well wall establishing a laminar shape for air to flow over. The well wall is also configured to flex when the bucket passes objects such as trees, rocks and water holding tanks.

Preferably, the bucket includes a top ring and a bottom ring. The well wall is connected to both the top ring and the bottom ring. The base plate is arranged to sit on and be connected to an upper face of the bottom ring. The former preferably includes a length of hose joined end on end and connected to the side wall adjacent to the top ring. The hose is preferably of a "lay flat" form so that when not expanded it will lay flat helping to reduce the vertical height of the collapsed bucket. In accordance with a preferred embodiment, the "lay flat" hose is abrasion resistant. This will facilitate the hose handling wear and tear, higher air pressure, and such a hose can also be folded wet and is mildew resistant.

At least one tie is preferably connected between the top and bottom rings so that load on the bottom plate is transferred to the at least one tie.

At least one rigging line is preferably arranged to be connected to the top ring. In use, the at least one rigging line is arranged to be connected to the aircraft so that the bucket can be suspended below the aircraft during use thereof.

In accordance with an alternative arrangement, the bucket is arranged to be connected to an aircraft so as to adopt a "belly tank" configuration. Preferably, the bucket is arranged to be connected to four or more aircraft hard point connections located on the underside of the aircraft belly. The bucket is preferably tethered using the existing bucket rigging lines, possibly with extension lines to further drop the bucket below the aircraft. For example, extension lines may be provided to locate the bucket between about 3.5 and 7 meters below the aircraft belly. Such a height would be similar to the height at which a submersible pump used to fill a conventional "belly tank" would be suspended below the aircraft.

It is envisaged that the extension lines could be of varying lengths to enable the bucket to be set at different heights below the aircraft. This may be necessary if trees or other obstructions around a water source restrict the helicopter's ability to lower to a height to enable the bucket to be filled at the water source.

According to a preferred embodiment of the invention, the side wall of the aerial fire-fighting bucket defines an upper opening and a lower opening, the upper and lower opening being substantially circular. When the bucket is fully loaded, the side wall preferably has a diameter dimension greater than the diameter of the upper opening.

Preferably, the upper opening has a smaller diameter than the lower opening.

In accordance with an embodiment of the invention, the lower opening is closed with a base plate and the bucket when fully loaded adopts a "flattened onion shape". The "flattened onion shape" lends itself to having a much smaller top opening than with conventional buckets and this significantly reduces the insipient drag of the wind passing over and around the bucket during use. This gives the bucket significantly better flight characteristics than prior art buckets, making embodiments very stable both empty and full. The small top opening also significantly reduces the skimming effect on the bucket when full of water. Those skilled in the art will appreciate that when the wind passes over the top of a bucket with a large top opening, a lot of water will be lost overboard during high-speed forward flight. This water loss is not beneficial. Another benefit of the "flattened onion shape" and the resultant reduced drag on a bucket according to an embodiment of the invention is that the bucket better follows the helicopter's speed. This is advantageous because when the helicopter comes to a hover over a water source, the bucket also arrives over the water source at the same time and is not held back by insipient drag or a strong head wind. This enables faster fill times from a given water source and much more accurate control of the bucket when water is being sourced from a buoy wall or confined water source which may only be a few meters across. Further, the bucket has a very low centre of gravity by keeping all the heavy mechanical components as close to the base of the bucket as possible. This also aids the stability of the bucket.

It is further recognised that a bucket in accordance with an embodiment of the invention may adopt different sizes. For example the diameter of the lower opening of the side wall may be increased for larger buckets and the height dimension of the side wall may also be increased. With such larger buckets, submersible pumps may be fitted to enable the bucket to be filled from water sources too shallow to enable filling by submerging the bucket.

There is further disclosed herein a valve arrangement for a fire-fighting bucket, said valve arrangement including at least one valve for controlling fluid flow through an aperture in a base of the bucket, the valve arranged to block the aperture in a closed position and to allow fluid to pass from within the bucket through the aperture when in an open position, and wherein the valve is arranged to move generally transversely across an upper face of the base plate as it is moved from the closed position to the open position to progressively reveal the aperture.

BRIEF DESCRIPTION OF DRAWINGS

Embodiments of the invention will now be described, by way of example only, with reference to the accompanying drawings in which.

DETAILED DESCRIPTION

A fire-fighting bucket 10 in accordance with an embodiment of the invention will now be described. Bucket 10 as illustrated in FIGS. 1 to 10 is shown empty, that is, without any fire retardant (e.g. water) contained therein. It will be appreciated that the Figures also show the bucket 10 as it would appear generally resting on the ground and not as suspended from an aircraft (e.g. a helicopter) as would be the case during use thereof. Some of the Figures show the bucket 10 as it would appear at least partially suspended. During use of the bucket 10, rigging lines would be connected to the bucket 10 to enable the bucket 10 to be suspended from the helicopter. The shape of the bucket 10 as shown in FIGS. 1 to 10 is not reflective of the shape that would be achieved when the bucket 10 is filled with a fire retardant. The filled shape is more closely represented by FIG. 11.

To simplify the following discussion, the fire-fighting bucket 10 will hereafter be described in connection with a helicopter and with reference to it being filled with water. It will however be appreciated that a fire-fighting bucket in accordance with an embodiment of the invention may be used with other forms of aircraft or other carrying devices and that the use of other fire retardants is also envisaged.

The fire-fighting bucket 10 illustrates a combination of features in accordance with various preferred embodiments of the invention. It should be understood that a bucket including features according to only one embodiment of the invention is anticipated, although it is recognised that it is more advantageous to incorporate features according to all embodiments in the same bucket.

The fire-fighting bucket 10 includes a well wall 20, a top ring 30, a bottom ring 35 and a base plate 40. A valve arrangement 50 is mounted on the base plate 40. An expandable former 90 is shown attached to an inner periphery of the well wall 20.

Figure 11:
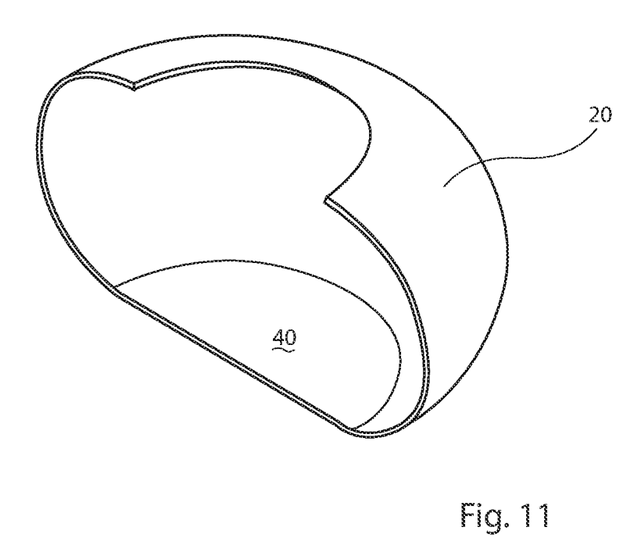
FIG. 11 is an isometric vertical cut-away view illustrating the likely half shape of the bag of a bucket made in accordance with an embodiment of the invention when it is full of water.

Well wall 20 is made from a sheet material, for example polyurethane sheet, which adopts the shape as generally indicated in FIG. 11 when the bucket 10 is holding maximum water capacity. It is envisaged that the well wall 20 could be made from a number of different materials and may adopt other shapes. However, in accordance with an embodiment of the invention, the material of the well wall 20 is preferably such as to allow the well wall 20 of the bucket 10 to be "collapsible" when not in use. The term "collapsible" is used to indicate an ability of the well wall 20 to flex or fold so that the well wall 20 can be brought adjacent to or in contact with the base plate 40. When a top ring 30 and a bottom ring 35 are attached to the well wall 20 as described later, the well wall 20 and the top ring 30 can be brought towards the bottom ring 35 and the base plate 40 when the well wall 20 is collapsed. This reduces the vertical height of the "collapsed" bucket 10 (as measured from the base plate 40) making it easier to store and transport, particularly within a vehicle such as a helicopter which has limited transport space.

The top and bottom rings 30, 35 each adopt the shape of a circular annulus and the well wall 20 is connected therebetween. The top and bottom rings 30, 35 preferably have different internal opening diameters, with the top opening being smaller than the bottom opening. This allows for the pitch of the rigging lines connecting the bucket 10 to the helicopter to lean towards a central point some distance above the top of the bucket 10. The height dimension of the well wall 20 is preferably such that when the bucket 10 is filled with water it adopts the "flattened onion shape" as shown in FIG. 11. As shown, the side wall 20 has a maximum internal diameter dimension greater than the diameter of the opening in the upper ring 30.

The base plate 40 is circular and sits on and is connected to the bottom ring 35. This shape and the resultant shape of the well wall 20 and base plate 40 have been selected as being preferred. However, it is envisaged that other shapes could be adopted. Further, it is envisaged that the base plate 40 could be connected to the well wall 20 without the use of the bottom ring 35.

Figure 1:
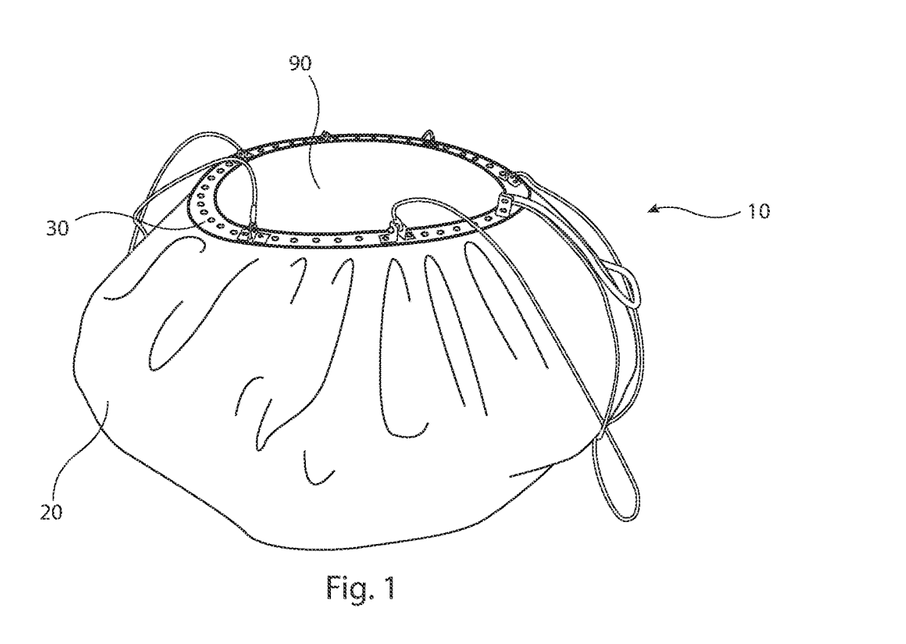
FIG. 1 is an isometric view of a fire-fighting bucket in accordance with an embodiment of the invention.
Figure 2:
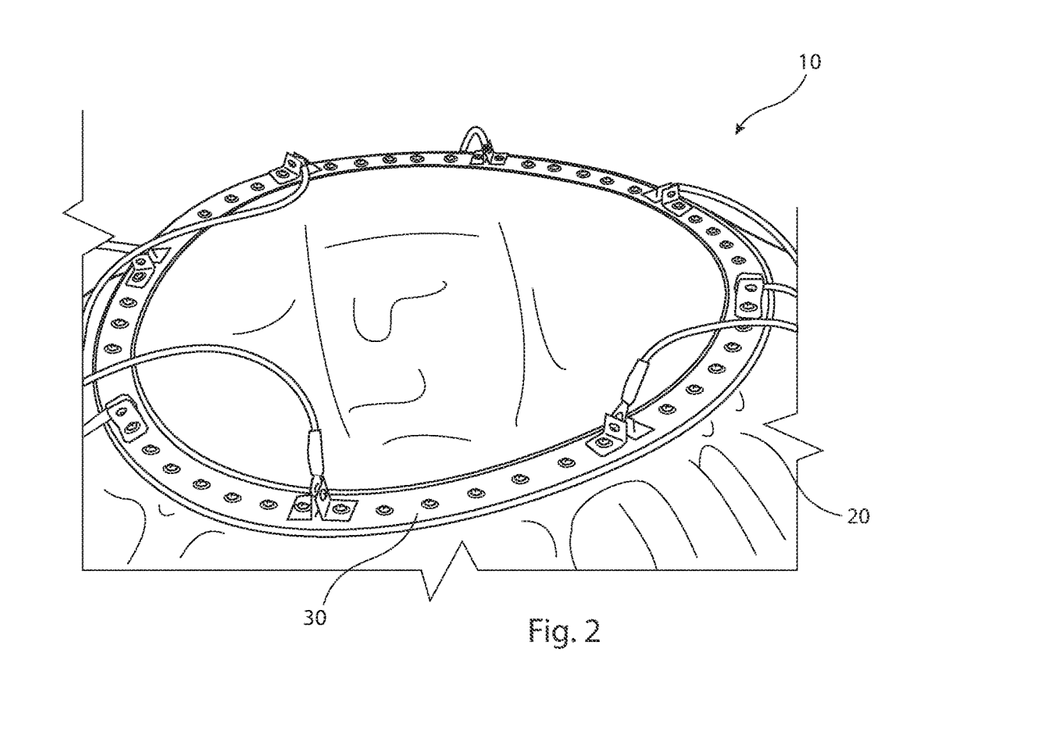
FIG. 2 is a top view of the bucket shown in FIG. 1.
Figure 3:
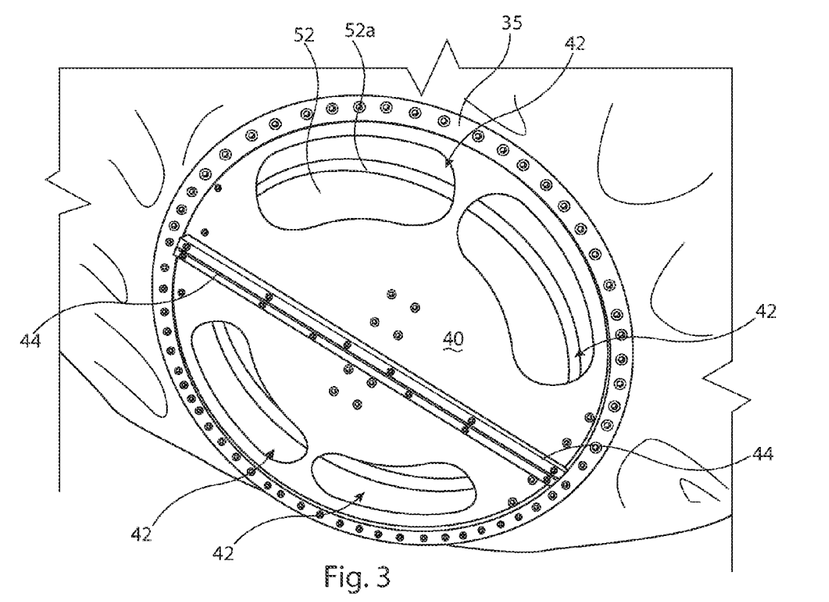
FIG. 3 a partial underneath view of the bucket showing the base plate.
Figure 4:
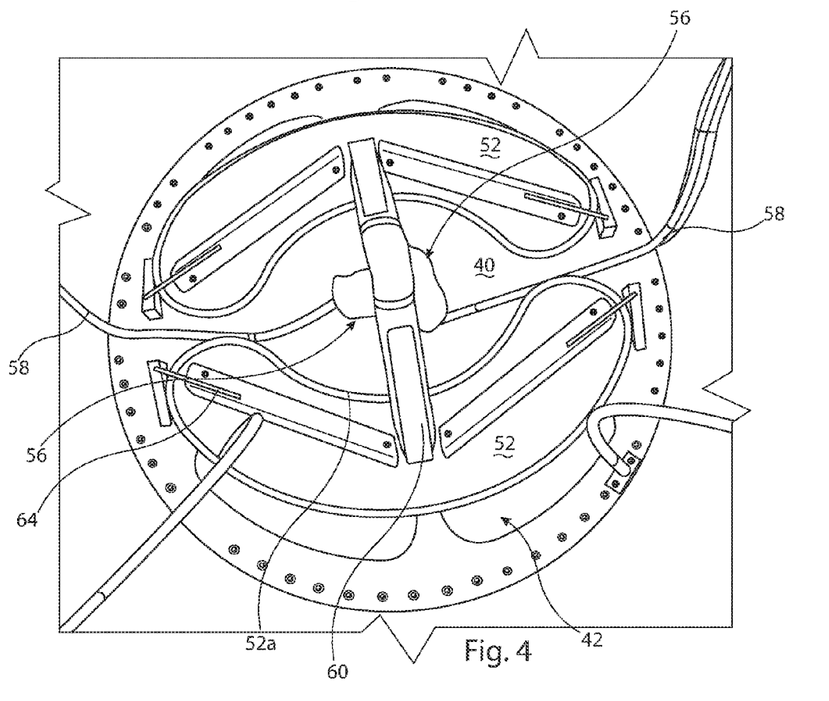
FIG. 4 is an inside view from a first angle of the bucket showing the valves in an open position.
Figure 5:
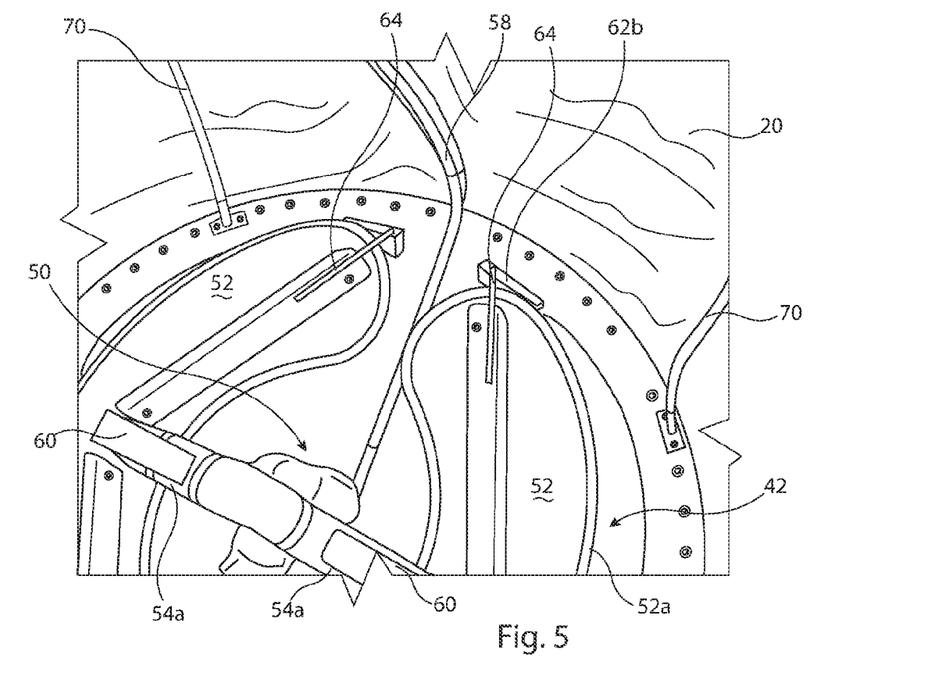
FIG. 5 is an inside view from a second angle of the bucket showing the valves in an open position.

Base plate 40 includes at least one aperture 42 through which water contained in the bucket 10 may be released upon activation of the valve arrangement 50. As best shown in FIGS. 3 and 4, and in accordance with the illustrated embodiment, base plate 40 includes four apertures 42 through which water can be released. The valve arrangement 50 (shown schematically in the Figures) includes two valves 52 and each valve 52 functions to control water flow through two of the apertures 42. Depending on the size of the bucket 10 and the requirements of the user, different numbers of apertures 42 may be provided in the base plate 40 and each valve 52 may control flow through one or more apertures 42.

The base plate 40 is preferably circular in shape. Base plate 40 establishes a rigid platform on which the valve arrangement 50 and other components are mounted so as to be located within the bucket 10. The base plate 40 is preferably made from a composite fibre glass and resin material, which may be stiffened by at least one stiffening beam.

As shown in FIG. 3, at least one spacer 44 is attached to the underside or lower face of the base plate 40. The spacer 44 is provided to ensure that if the bucket 10 is lowered into a water supply and makes contact with, for example, the dam floor, a gap is maintained between the lower face of the base plate 40 and the dam floor. This gap allows water to still flow into the bucket through the open apertures 42 when filling and also helps to minimise the amount of suction between the base plate 40 and dam floor that may otherwise prevent the bucket 10 from being lifted away from and off the dam floor when the bucket 10 is full. Although the spacer 44 is shown as two bars extending across the diameter of the base plate 40, other forms of spacers could be used to ensure that the required "gap" is established.

Figure 6:
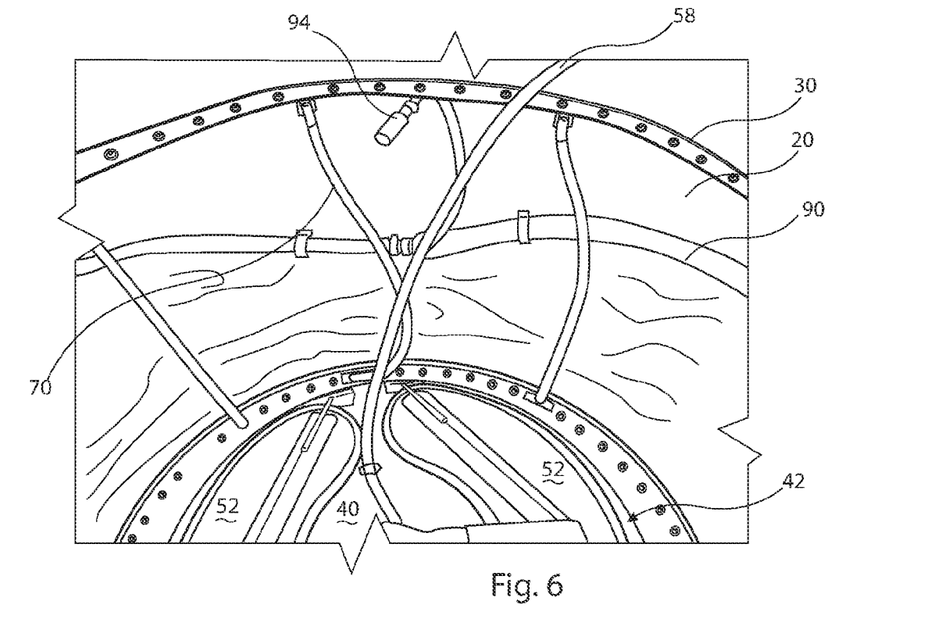
FIG. 6 is an inside view from a third angle of the bucket showing the valves open and the valve guides.
Figure 7:
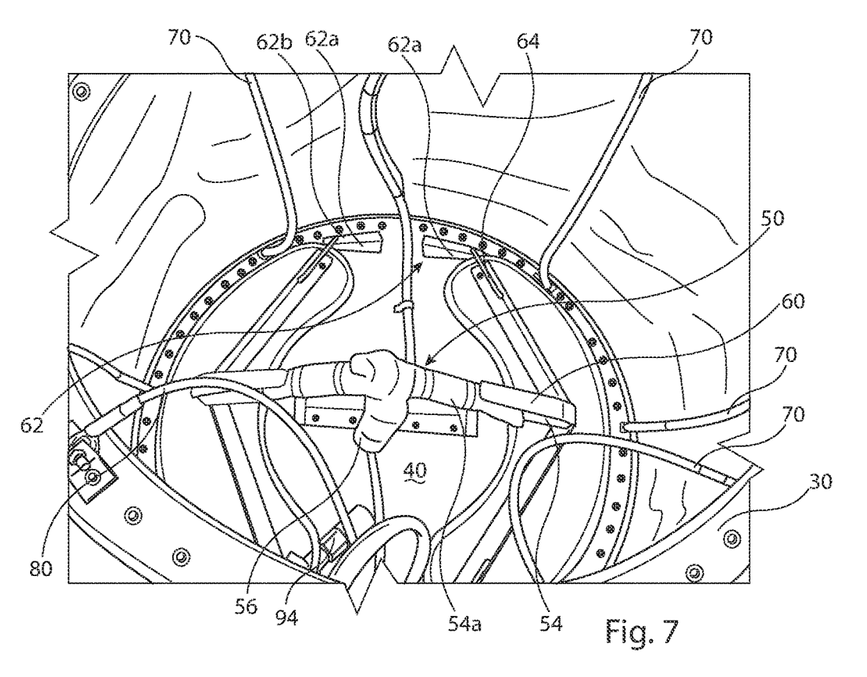
FIG. 7 is another inside view of the bucket showing the valves closed.

FIGS. 4 to 9 best illustrate the operation of the valve arrangement 50. In FIGS. 4 to 6 and 9, the two valves 52 of the valve arrangement 50 are depicted in different degrees of open position allowing water to flow through the apertures 42 in the base plate 40. In FIGS. 7 and 8, the two valves 52 are in the closed position functioning to prevent water from flowing through the apertures 42 in the base plate 40.

The valve arrangement 50 further includes two linear actuators, each linear actuator being arranged to control one of the valves 52. Each linear actuator includes an arm 54 (FIG. 7) located within a housing 54a and an electrical motor 56. The electrical motor 56 is arranged via a gear box to drive the arm 54 (which is directly connected to the valve 52) in and out of the housing 54a so as to move the valve 52 between the closed and fully open positions. Although an electrical motor 56 is used to actuate the arms 54 of this embodiment, other means for actuation of such arms 54 are envisaged (e.g. pneumatic, hydraulic). It is preferable that the arms 54 are driven independently so that a single one of the valves 52 can be operated as selected by the user. A controller (not shown) will be operated by the user to drive opening and closing of the valves 52. The controller will typically be mounted within the aircraft. Electrical power to the motor 56 will be provided through waterproof lines 58 extending from a power source (not shown) located in the helicopter.

A guard 60 extends over each actuator housing 54a and is arranged to protect the arm 54 from damage or from being fouled by rigging lines. The guard 60 also prevents the top ring 30 from damaging the arms 54.

Each valve 52 is made from a piece of flat plate that is cut to the required shape so as to fully cover the associated apertures 42 when the valve 52 is in the closed position. As shown, the plate is sized and shaped to cover two adjacent apertures 42 when the valve 52 is in the closed position. The plate is preferably made from stainless steel. However, the valves 52 could be made from other materials such as carbon fibre. The use of a carbon fibre material would reduce valve weight and improve their strength. A seal 52a is fitted around the periphery of each flat plate and is provided to establish a seal between the plate of the valve 52 and the base plate 40 when the valve 50 is in the closed position, thereby preventing leakage of water from the bucket 10 through the apertures 42.

The actuators of the valve arrangement 50 are mounted centrally of the base plate 40 and between the two valves 52.

The actuator housings 54*a* extend at an angle to the base plate 40 so that the end of the arm 54*a* in connection with the motor 56 is vertically further displaced from the base plate 40 than the end connected to the valve 52. This ensures that the lowest mechanical height of the components is established and hence the lowest bucket centre of gravity, whilst still providing a high outflow of water from the bucket 10 with minimal movement of the valve 52.

As explained previously, each valve 52 is arranged to be moved between the fully closed and the fully open position by activation of the motor 56. The valve 52 is arranged to move between the open and closed position generally in a plane extending across the plane of the upper face of the base plate 40 as opposed to a conventional prior art arrangement requiring a vertical lifting type movement towards and away from the base plate 40. The valves 52 have an incline angle of around about 17 to 25 degrees to ensure appropriate clearance for the apertures 42 to enable full water flow as the valves 52 are moved across the face of the apertures 42.

There may be a tendency for the valve 52 to twist as it is driven between the open and closed positions, due to rotation of the actuator extension tube when it is translated. Accordingly, guides 62 are located on the upper face of the base plate 40, one at each end of each valve 52. As best shown in FIGS. 4 to 9, and more particularly in FIG. 7, each guide 62 is a generally triangular shape block with an inner face 62*a* arranged to contact a part of the outer edge of the seal 52*a*. The inner face 62*a* of the two guides 62 associated with each valve 52 establish a gap therebetween through which the valve 52 can move. Contact between the outer edge of the seal 52*a* of each valve 50 and the inner face 62*a* of each guide 62 serves to guide the directional movement of the valve 52 along the length of the gap.

FIGS. 4 and 9 also show a lift bar 64 extending from each end of each valve 52. Each lift bar 64 extends over at least a part of an angled upper face 62*b* of each guide 62 and is further configured to contact the angled upper face 62*b* of the guide 62 as the valve 52 moves generally transversely across the upper face of the base plate 40 under the action of the motor 56. It will thus be appreciated that when the valve 52 is moved from the closed position to the open position shown, the lift bar 64 travels up the angled upper face 62*b* of the guide 62 lifting the valve 52 away from the base plate 40. This "lift" is provided to help break the seal between the seal 52*a* and the upper face of the base plate 40, counteracting the downward load applied on the valve 50 and seal 52 by the water contained in the bucket 10. The lift bar 62 also helps ensure that the valve 52 and seal 52*a* contact the base plate 40 in a flat plane. It will of course be appreciated that the valve 52 is actually opened to reveal the aperture 42 by virtue of the generally transverse movement of the valve 52 across the base plate 40.

The valve guides 62 also provide a barrier to the rigging, former 90 and other cable being inadvertently caught under the valve 52.

As explained previously, the well wall 20 of the bucket 10 is "collapsible" to facilitate storage and transport. However, during use of the bucket 10 the shape of the well wall 20 is determined predominantly by the loading applied by water contained in the bucket 10. The weight of the water contained in the bucket 10 is substantial and must be supported to prevent bucket damage. The weight of the bucket 10 with water load is preferably carried by internal rigging including a number of ties 70 that are connected between the top ring 30 and the bottom ring 35. The ties 70 are preferably of a length relative to the height dimension of the well wall 20 so that when the bucket 10 is full, the well wall 20 adopts the shape generally indicated in FIG. 11. Ties 70 are preferably spaced equidistant around the top and bottom rings 30, 35 and are configured to extend substantially vertically when the bucket 10 is in use suspended from a helicopter. In this way, the weight of the bucket 10 with water load can be transferred from the base plate 40, to bottom ring 35, to the ties 70, to the top ring 30 and then through the rigging lines 80 used to suspend the bucket 10 from the helicopter.

Figure 12:
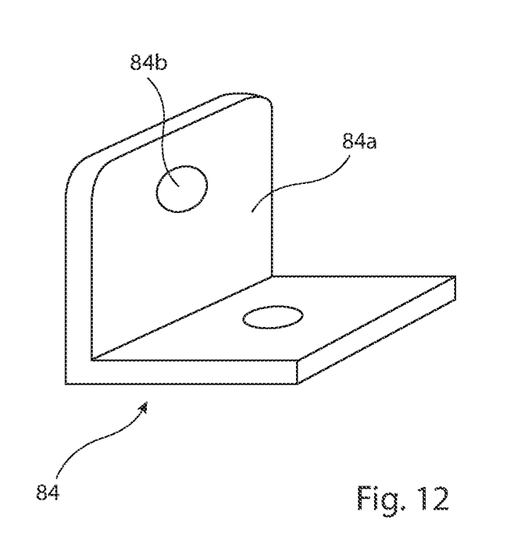
FIG. 12 is an isometric view of a rigging bracket.

FIGS. 8 and 9 best show the connection of rigging lines 80 to the top ring 30 of the bucket 10. Each rigging line 80 is connected to the top ring 30 via a rigging bracket 82. Each rigging bracket 82 includes a pair of L-shaped cross-sectional members 84 (see FIG. 12) which are connected to the top ring 30 so that a spacing is established between the upright parts 84*a* of the adjacently located members 84. The looped end of the rigging line 80 is located in the spacing and a bolt 86 with a nylon bush is passed through the apertures 84*b* in the upright parts 84*a* so as to extend through the looped end of the rigging line 80. A nut 88 is then used to secure the bolt 86 to the rigging bracket 82. The nylon bush allows the looped end of the rigging line 80 to swing freely about the shaft of the bolt 86. The enables the looped end of the rigging line 80 to adopt the position shown generally in FIG. 9, whilst also allowing the line to extend generally vertically when the rigging line 80 is suspending the bucket 10 from the helicopter. The ability of the looped end of the rigging line 80 to move to the position generally shown in FIG. 9 helps further reduce the vertical height of the collapsed basket 10 because there are no upwardly extending rigging lines 80. This results in a more compact bucket for storage.

It will also be appreciated that the configuration of the rigging brackets 82 and the rigging lines 80 connected thereto is such that the water load of the bucket 10 is readily transferred to the rigging lines 80. The top ring 30 effectively only acts as a means to hold up the well wall 20 and to generally guide the ties 70 at an angle of about around 8 to 12 degrees, preferably about 10 degrees, from the base plate 40 outer diameter. The rigging lines 80 then extend upwardly at a similar angle to a central connection point anywhere from about 3.5 to 10 meters above the top of the bucket 10. The positioning of the central connection point depending on the base diameter and the well wall dimensions. The rigging lines 80 and ties 70 maintain a generally straight line from the base plate 40 to the central rigging connection eliminating any stress on the upper ring 30, allowing it to be made from a light material, such as stainless steel or a composite material.

Although it is advantageous for well wall 20 of the bucket 10 to be collapsible as discussed previously, a bucket 10 with a fully collapsed side wall 20 will be difficult to fill, particularly if it is lowered into a water source (e.g. a dam or swimming pool) for filling and there is no structure or former to hold the well wall 20 in an outward position so as to form with the base plate 40 a "well" to receive water. Accordingly, at least one former is preferably provided within the bucket 10 to provide, support to the well wall 20 to prevent collapse of a least a part of the well wall 20 towards the base plate 40. The former is preferably an expandable former. The intention being that the expandable former when expanded provides sufficient support to the well wall 20 to cause "expansion" thereof. The term "expansion" is used to indicate that the well wall 20 is moved to and supported in a position where a "well" is established (in conjunction with the base plate 40) to receive water. It is not intended to indicate that there is any deliberate stretching or permanent deformation of the material from which the well wall 20 is made. Typically, when the bucket 10 is collapsed, the well wall 20 will be folded over itself towards the base plate 40 or otherwise pressed together so that there is no effective "well" to receive water. Thus, it is not easy to fill the collapsed bucket 10 with sufficient water weight to cause the internal ties 70 to move to a generally vertical orientation wherein the bucket 10 achieves the shape shown generally in FIG. 13. Further, it is advantageous to include a former so that an empty bucket 10 suspended below a helicopter will retain a shape that provides an effective "well" irrespective of any wind or water loading on the bucket 10. This allows the bucket 10 to be easily refilled at a water source by lowering the bucket 10 thereinto until water flows over the upper ring 30 and into the well bounded by the base plate 40 and the well wall 20 which are prevented from collapsing inwardly by the former. Water also flows into the bucket 10 through the open apertures 42 to assist the sink rate of the bucket 10 into the water source. The former may also prevent the well wall 20 from lifting up through the top ring 30 when it impacts with a water source.

Although different formers may be adopted and different numbers of formers included, an embodiment of the present invention includes a single former in the form of an inflatable ring 90. Inflatable ring 90 is located within the bucket 10 and is preferably secured to the well wall 20 using brackets 92 or other connections. The inflatable ring 90 is preferably connected to the well wall 20 adjacent the upper ring 30. In accordance with the illustrated embodiment, inflatable ring 90 is arranged for inflation by air pumped into the ring 90 via an air connection coupling 94 (FIG. 6). An air compressor (not shown) can be connected to the coupling 94 and used to inflate the inflatable ring 90 until the former adopts the required shape and provides sufficient support to the side wall 20. Preferably, the ring 90 will be expanded until a small well is established by the base plate 40 and side wall 20. It is envisaged that when the bucket 10 is suspended from a helicopter and the former 90 expanded it would adopt an appearance somewhat similar to that generally indicated in FIG. 1. The inflatable ring 90 will then remain inflated until it is deliberately deflated when it is desired to collapse the bucket 10 at a later point in time.

The inflatable ring 90 may be formed from a length of lay flat hose that is joined end to end and that is of sufficient length to extend around the inner periphery (circumference) of the well wall 20. Lay flat hose is particularly suitable because when it is not inflated, it will lay flat allowing the well wall 20 of the bucket 10 to more readily collapse, thereby minimising the height of the collapsed bucket 10 above the base plate 40. The use of an abrasion resistant lay flat hose is preferred.

The inflatable ring 90 may include an internal member that extends within the ring so as to prevent the lay flat house from inadvertently kinking during expansion. The internal member may take the form of a length of hose, for example heater hose.

When the ring 90 is inflated, it provides support to the well wall 20 and prevents the well wall 20, at least in a zone immediately adjacent the ring 90 from collapsing inwardly towards the base plate 40. Accordingly, the inflated ring 90 helps to maintain a "well" for receiving water within the bucket 10 and to hold a required shape of the well wall 20.

To avoid air pockets from forming within the bucket 10 as it is being filled with water and to thus enable the bucket 10 to be filled to capacity, vents 100 may be provided to quickly vent trapped air from the bucket 10. An example of such a vent 100 is shown in FIG. 8. As shown, vent 100 is a length of tube that is connected to the well wall 20 and the top ring 30. Vent 100 allows air to flow from the lower end of the tube to the upper end of the tube which is located above the fill height of the bucket 10. A number of such vents 100 are preferably spaced around the inner circumference of the top ring 30.

It is envisaged that in accordance with a further embodiment of the invention, a small diameter rope or cable may be attached to the underside of the top ring 30 and may extend through the vent 100 and then looped around the former 90. This may assist in keeping the former 90 at an appropriate height within the brackets 92 when the bucket 10 is lifted off the ground.

Embodiments of the invention are advantageous because:
- The valves 52 move generally transversely across the base plate 40 to open and close the apertures 42 in the base plate 40. As the apertures 42 are located in the base plate 40 (the lowest point of the bucket 10) complete emptying of the bucket 10 can be easily achieved. The valves 52 can be formed with a large perimeter making it possible to increase the size of the apertures 42, thereby increasing water dump rates.
- Transverse movement of the valves 52 across the upper face of the base plate 40 is advantageous because it establishes a lower mechanical height of the components. The outer and inner radius of the valves are substantially increased by following the maximum radius of the bucket base plate, giving a high flow rate through the apertures in the base plate with minimal height gain of the valve when translating. A prior art vertical valve drive may require a travel height of around 100-300 mm, whereas an arrangement according to an embodiment of the invention provide full water flow through the apertures with a height of around 1-50 mm.
- As the actuators 54 of the valve arrangement 50 are configured to move the valves 52 generally transversely across the base plate 40, the height of the valve arrangement 50 above the base plate 40 is relatively low, resulting in a decreased collapsed bucket height. The lower the collapsed bucket height the easier it is to store and transport.
- The valve arrangements 50 are easy to maintain and repair. Replacement can be performed quickly with minimum down time.
- Valve arrangements as used in accordance with an embodiment of the invention provide the user with full and incremental operational control of valve opening/closing. With practice, a user (typically the pilot) can become very skilled in the timing of the valve opening to regulate water flow to the fire site very accurately. Further, the amount of valve opening can be accurately controlled, preferably to as little as a few millimeters of opening. This again allows the user to control water dump volume over a site.
- The bucket 10 is able to be quickly filled upon dropping it into a water supply because the bucket 10 includes a former that establishes a required shape of the well wall. The required shape is preferably such as to establish a well for receiving water in conjunction with the base plate 40.
- The inclusion of internal ties 70 between the upper and lower rings 30, 35 helps direct the weight load of the filled bucket 10 vertically to the aircraft via the rigging lines 80. This helps to reduce forces on the bucket 10 that may otherwise cause damage to the bucket 10, particularly the side wall 20. The ties 70 also stop the top ring 30 from continuing to rise away from the base plate 40 pulling the well wall 20 into a substantially cylindrical shaped vessel. If this was to occur it would cause substantial wrinkling of the fabric of the well wall 20. The ties 70 maintain the well wall 20 in a shape similar to that shown in FIG. 13. This gives the bucket 10 a substantially shorter fill height than prior art buckets enabling the operator to fill the bucket 10 from water sources not useable by prior art buckets.

The collapsed height of the bucket 10 will typically be about 300 mm. This enables the bucket 10 to be filled from very shallow water sources. Further, when used as a "belly tank", the helicopter can land directly over the flattened bucket when refuelling or parking without damaging either the bucket or the helicopter. Further, a collapsed bucket in accordance with an embodiment of the invention can be transported or stored in the cargo bay of the aircraft. If necessary, the collapsed bucket could also be transported in the aircraft cabin to allow more room for equipment carriage in the cargo bay. The bucket would normally be transport and stored in a carry bag.

It is envisaged that embodiments of the invention could be modified to enable the bucket to be connected to the underbelly of a helicopter. This would enable the bucket to be used in a "belly tank" configuration. This would prevent the bucket from being inadvertently released which can happen when the bucket is slung from a single conventional electrically operated helicopter cargo hook. Inadvertent release can occur through inadvertent activation of the electric cargo release button, inadvertent activation of the manual cargo relates pedal/lever, by a stray electrical current within the aircraft circuitry triggering electrical release of the cargo hook, or by a "dynamic roll out" of the ring attached to the rigging lines through the cargo hook keeper. This can be caused due to the use of an incorrect lifting ring for the size of the cargo hook. Further, with such a "belly tank" configuration, it would be possible for the helicopter to land directly over the collapsed bucket without causing damage to the helicopter or the bucket.

A "belly tank" configuration would be further advantageous as it would allow the use of helicopters to fight fires around and over houses, streets and highways etc where having a bucket extending from rigging lines is normally problematic due to impact and entanglement risks and accidental release as described above.

The ability of a bucket in accordance with an embodiment of the invention to be used in either a "belly tank" configuration or in a conventional suspended configuration provides increase versatility of use. It eliminates the need to purchase a specially designed and expensive belly tank. Such tanks are typically made of fibreglass and are bolted to the belly of the helicopter and are typically filled using a suspended submersible pump. One disadvantage of such arrangements is that it can take from one to four hours (depending on the design) to either attach or remove the tank, whereas a belly tank bucket according to an embodiment of the invention could be fitted in around 15 minutes. Prior art fibreglass belly tanks are very heavy and need to be transported by vehicle. Further, the solid construction of such belly tanks reduces the possible speed of the helicopter due to high tank drag.

Embodiments of the invention provide greater flexibility to the purchaser because the bucket can be used as a "belly tank" or as a suspended bucket simply by changing how and where the rigging lines of the bucket are attached to the helicopter. This provides considerable cost savings to the purchaser.

The embodiments have been described by way of example only and modifications within the spirit and scope of the invention are envisaged.

The invention claimed is:

1. An aerial fire-fighting bucket comprising:
a base plate and a valve arrangement comprising at least one valve and a linear actuator, the base plate comprising a least one aperture and the valve arranged to block the aperture in a closed position and to allow fluid to pass from within the bucket through the aperture when in an open position;
a seal provided to establish a seal between the valve and the upper face of the base plate, arranged so that as the valve is moved generally transversely between the closed and open position, the valve is caused to lift away from the base plate so as to break the seal established between the valve and the upper face of the base plate,
wherein the valve is arranged to be moved by the linear actuator generally transversely across an upper face of the base plate between the closed position and the open position of the valve to progressively reveal the aperture.

2. An aerial fire-fighting bucket according to claim 1, wherein the valve is configured so that as the valve is moved away from the closed position towards the fully open position, the valve clears at least a part of the aperture so that fluid flows through the aperture.

3. An aerial fire-fighting bucket according to claim 1, wherein the valve comprises a substantially flat plate sized and shaped to fully cover and block flow through the at least one aperture when the valve is in the closed position.

4. An aerial fire-fighting bucket according to claim 1, wherein at least one guide is mounted on the base plate and is configured to guide movement of the valve.

5. An aerial fire-fighting bucket according to claim 4, further comprising two guides and wherein the valve is arranged to move along a gap established between the two guides, with movement of the valve guided by contact with the guides.

6. An aerial fire-fighting bucket according to claim 1, wherein a cam face is provided to lift the valve away from the base plate as the valve is moved between the closed and open positions.

7. An aerial fire-fighting bucket according to claim 1, wherein the actuator is driven by an electrical arrangement, a pneumatic arrangement, or a hydraulic arrangement.

8. An aerial fire-fighting bucket according to claim 1, further comprising two valves, each valve arranged to block at least two apertures formed in the base plate.

9. An aerial fire-fighting bucket according to claim 1, further comprising a well wall arranged for connection to the base plate and arranged to be collapsible so as to be moveable between an in-use position where the well wall together with the base plate establish a well for holding fluid, and a storage position in which the well wall is collapsed and capable of being located substantially adjacent to the base plate.

10. An aerial fire-fighting bucket according to claim 9, further comprising a top ring and a bottom ring, the well wall being connected to both the top ring and the bottom ring.

11. An aerial fire-fighting bucket according to claim 10, wherein said at least one inflatable former comprises a length of hose joined end on end and connected to the side wall adjacent to the top ring.

12. An aerial fire-fighting bucket according to claim 11, wherein the hose is a lay flat hose.

13. An aerial fire-fighting bucket according to claim 9, wherein the well wall is made from a polyurethane sheet material.

14. An aerial fire-fighting bucket according to claim 1, configured to be connected to the aircraft so as to adopt a "belly tank" configuration.

15. An aerial fire-fighting bucket comprising:
- a base plate and a valve arrangement comprising at least one valve and a linear actuator, the base plate comprising a least one aperture and the valve arranged to block the aperture in a closed position and to allow fluid to pass from within the bucket through the aperture when in an open position;
- at least one inflatable former, said at least one former arranged to provide support to at least a part of the well wall when inflated so as to prevent that part of the well wall from collapsing towards the base plate
- a well wall arranged for connection to the base plate and arranged to be collapsible so as to be moveable between an in-use position where the well wall together with the base plate establish a well for holding fluid, and a storage position in which the well wall is collapsed and capable of being located substantially adjacent to the base plate,
- wherein the valve is arranged to be moved by the linear actuator generally transversely across an upper face of the base plate between the closed position and the open position of the valve to progressively reveal the aperture.

16. An aerial fire-fighting bucket according to claim 15, wherein a seal is provided to establish a seal between the valve and the upper face of the base plate.

17. An aerial fire-fighting bucket according to claim 15, wherein the inflatable former extends substantially about an inner periphery of the well wall.

18. An aerial fire-fighting bucket according to claim 15, configured to be connected to the aircraft so as to adopt a "belly tank" configuration.

19. An aerial fire-fighting bucket comprising:
- a base plate and a valve arrangement comprising at least one valve and a linear actuator, the base plate comprising a least one aperture and the valve arranged to block the aperture in a closed position and to allow fluid to pass from within the bucket through the aperture when in an open position;
- a well wall arranged for connection to the base plate and arranged to be collapsible so as to be moveable between an in-use position where the well wall together with the base plate establish a well for holding fluid, and a storage position in which the well wall is collapsed and capable of being located substantially adjacent to the base plate;
- a top ring and a bottom ring, the well wall being connected to both the top ring and the bottom ring,
- wherein the base plate is arranged to sit on and be connected to an upper face of the bottom ring and wherein at least one tie is connected between the top and bottom rings so that load on the bottom plate is transferred to the at least one tie.

* * * * *